Patented Aug. 29, 1944

2,356,764

UNITED STATES PATENT OFFICE 2,356,764

METHOD FOR PRODUCING FILM-FORMING DIAMINE-CARBON DISULPHIDE CONDENSATION PRODUCTS

Rudolf Kern, Ludwigshafen-on-the-Rhine, Germany; vested in the Alien Property Custodian No Drawing. Application March 30, 1940, Serial No. 326,967. In Germany April 5, 1939

1 Claim. (Cl. 260—2)

The present invention relates to high-molecular weight film-forming condensation products and a process of producing same.

I have found that high-molecular film-forming condensation products are obtained by reacting carbon disulphide with aliphatic diamines, the amino groups of which are separated from each other by at least 5 carbon atoms and heating the dithiocarbamic acids formed at temperatures of between 60 and 300° C., preferably from 120 to 200° C., whereby hydrogen sulphide is split off.

The reaction is likely to take the following course:

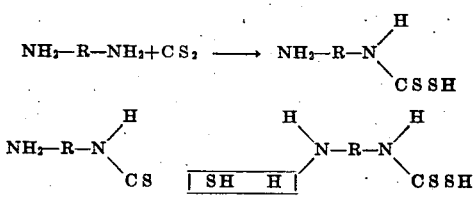

The latter formula shows the first step in the further condensation of the dithiocarbamic acids which proceeds with the splitting off of hydrogen sulphide and the formation of the dimer; this dimer, by reacting with another molecule of dithiocarbamic acid or the dimer thereof, forms higher molecular products until by continued heating film-forming condensation products are formed.

As initial materials such aliphatic diamines are used as bear their amino groups separated from each other by more than 4 carbon atoms, as for example pentamethylene diamine, hexamethylene diamine, octamethylene diamine, decamethylene diamine, undecamethylene diamine and dodecamethylene diamine. Diamines, the carbon chain of which is interrupted by hetero atoms such as oxygen or sulphur or atomic groups as for example the NH-group may also be used. The corresponding alkyl-, aryl- or aralkyl-substituted diamines which still contain at least one hydrogen atom attached to each nitrogen atom may equally be employed. Alternatively, alkyl, aryl or aralkyl groups may also be introduced into the dithiocarbamic acids first obtained before they are further condensed.

Besides or instead of carbon disulphide there may also be employed thiophosgene, in which case dithiocarbamic acid chlorides are formed in the first stage of the reaction, hydrogen chloride being evolved; carbon disulphide, however, is preferred on account of its greater ease in manipulation.

The dithiocarbamic acids are prepared by causing carbon disulphide to act upon the diamine at ordinary temperature. It is advantageous to use a diluent, such as water, methanol or ethanol. The dithiocarbamic acids are generally obtained in the form of colorless crystals.

The further condensation of the dithiocarbamic acids which proceeds with the splitting off of hydrogen sulphide may be carried out depending on the final products obtained under atmospheric, reduced or superatmospheric pressure either in the presence or absence of solvents or diluents. Instead of heating the acids themselves their salts, preferably their alkali salts may be heated for further condensing. Thus, for example, when heating a solution of the dithiocarbamic acids in soda lye, the same products are formed. Air is preferably excluded, because it sometimes causes side-reactions and discoloration of the reaction products.

The reaction products are fusible and may be drawn into threads when working under mild conditions, and are infusible when working under more energetic conditions. The high-molecular weight condensation products obtained may be used for a great variety of purposes, either alone or in combination with other suitable substances, for example for the production of films and threads, coatings, adhesives, putties and in the manufacture of safety glass, furthermore as assistants in the textile, artificial leather and paper industry as well as for the manufacture of pressure-moulded or injection-moulded articles.

The following examples serve to illustrate the nature and the properties of the products in accordance with the present invention and the methods of their production. The invention, however, is not restricted to these examples. The parts are by weight.

*Example 1*

116 parts of 1.6-hexamethylene diamine are dissolved in 1000 parts of ethanol of 96 per cent strength and 145 parts of carbon disulphide are slowly introduced at 0° C. To prevent formation of supersaturated solutions and consequent separation of the reaction product in an oily state, it is preferable to add crystals of dithiocarbamic acid formed in a preceding batch. The dithiocarbamic acid formed thus separates as beautiful colorless crystals. They are filtered off by suction and washed with alcohol or water. For further purification, which, however is not necessary, they may be recrystallized from ethanol or water. The pure dithiocarbamic acid ($NH_2-(CH_2)_8-NH.CSSH$) melts at between 156° and 158° C.

When causing the aqueous solution of the dithiocarbamic acid to boil for some time, hydrogen sulphide is split off and an oily product which is insoluble in water, separates. It is soft and plastic at ordinary temperature. It is readily soluble in formic acid. It cannot be precipitated quantitatively by water, but forms a gel by the addition of water.

By heating the substance separated by boiling the aqueous solution of the dithiocarbamic acid or heating the pure dithiocarbamic acid itself in the form of the colorless crystals (melting point 156 to 158°) above 160° C. for a longer space of time, there takes place a further or first splitting off—as the case may be—of hydrogen sulphide, tough melts being thus formed. This melt may be drawn into threads which on stretching in the cold state may be orientated whereby their tensile strength is considerably improved. Furthermore the melt may be cast or drawn into ribbons or films, which may be oriented by rolling and thus improved. The product is still soluble in formic acid and may be precipitated with water. After drying it is hard, crumbly, tough and elastic material.

By further heating the melt the condensation may be carried on until practically infusible pale products are obtained which in the cold state are very hard and hornlike masses. They may be used for the manufacture of a great variety of articles, either by working them with cutting tools or by pressing them hot. In this state the product is no more or but little soluble in formic acid.

The condensation of the dithiocarbamic acid which proceeds with the splitting off of hydrogen sulphide may also be carried out in the presence of solvents or diluents. The high-molecular condensation product formed thereby sometimes separates similarly as when condensing in water. Suitable solvents or diluents are, for example, pyridine, quinoline, hexahydrodiethylaniline, xylene, tetrahydronaphthalene, glycol or glycerine.

*Example 2*

28.6 parts of octamethylene diamine are dissolved in 250 parts of ethanol and cooled down to 0° C. A mixture of 17 parts of carbon disulphide and 50 parts of ethanol is then dropped in very slowly, while stirring, to prevent formation of undercooled solutions, the temperature being maintained between 0 and 10° C. After a short time the 1-amino-octamethylene-8-dithiocarbamic acid begins to precipitate in the form of very fine and colorless crystals. The solution is further stirred for some hours while cold, the crystals are then filtered off by suction, again suspended in ice-cooled ethanol, filtered and dried. The pure acid melts at between 145 and 147° C. with decomposition. On heating the acid to 160° C. in the absence of air hydrogen sulphide is split off, a high-molecular condensation product being formed which is suitable for use as a plastic.

*Example 3*

81.6 parts of butane-diol-1.4-di-normal-propyl-ether-ω.ω'-diamine corresponding to the formula $H_2N-CH_2-CH_2-CH_2OCH_2-CH_2-$

are dissolved in 400 parts of ethanol, whereupon a mixture of 31 parts of carbon disulphide and 100 parts of ethanol is slowly run in, the temperature being maintained between 0 and 10° C. The dithiocarbamic acid precipitated is filtered off by suction after about 12 hours, twice washed with ice-cooled ethanol and dried. The yield amounts to 92 per cent of the theory; the acid melts at 104°.C. with decomposition. The acid is dissolved in a 25 per cent caustic soda solution and the clear solution which results is heated to boiling. After some time the insoluble condensation product begins to separate on the lye. It is removed, washed with boiling water until neutral and dried. It may be used as a plastic for the preparation of coatings or moulded articles or as an addition for coatings and plastics.

What I claim is:

A process of producing film-forming condensation products which comprises condensing butane-diol-1.4-di-normal propyl ether-ω-ω'-diamine with carbon disulphide to form the corresponding monoamino dithiocarbamic acid, dissolving the said acid in caustic soda solution of about 25%, and then heating the formed clear solution to boiling until a water-insoluble film-forming condensation product is formed and separates from the solution.

RUDOLF KERN.